Patented July 1, 1930

1,769,430

UNITED STATES PATENT OFFICE

ANNA HENKE, OF SAWYER, NORTH DAKOTA

BOX

Application filed February 24, 1928. Serial No. 256,647.

In small farming or in truck gardening, the gardener experiences considerable difficulty in determining the nature of vegetables which he has planted in the early growth thereof. It is customary to place sticks in the ground around the bed of vegetation, but rains frequently cause the dislodgement of such sticks and likewise the obliteration of the names imprinted thereon. It is, therefore, the object of my invention to provide a marking means for vegetation which shall comprise a comparatively small box of suitable weatherproof material having a hinged lid which sheds rain therefrom and having a socket on its rear face provided with an integrally formed spring gripping finger for engagement with the stick that is forced through the socket and which enters the ground, the box being designed to contain the package of seeds which are to be planted, and to retain therein the envelope in which the seeds are delivered so that by simply opening the box and observing the name on the envolope the planter will have no doubt as to the kind of seed which he has planted, the box being also designed for the reception of printed matter regarding the cultivation of the vegetables.

To the attainment of the foregoing and other objects which will present themselves as the nature of the invention is better understood, the improvement resides in certain other novel features of construction, combination and operative association of parts, one satisfactory embodiment of which is disclosed by the accompanying drawings.

In the drawings:

Figure 1 is a perspective view of the improvement.

Figure 2 is a similar view looking toward the rear of the box.

In carrying out my invention I make use of a substantially rectangular box 1 of suitable metal. The top of the box is inclined from its back downwardly to its front and hinged to the upper edge of the back of the box there is a cover 2 that has a continuous flange 3. The hinge is of a construction to prevent moisture entering the box at the rear thereof, while the flanges 3 will protect such entrance through the remaining portion of the mouth of the box.

Welded or otherwise secured on the back of the box there is a tubular member that provides a socket 4. This socket is slitted both longitudinally and laterally and the metal bounded by the slit is bent upon itself to form the same with an inwardly directed spring gripping finger or tongue 5. It will be observed that the socket 4 and spring 5 are formed from a single blank of material, which provides attaching flanges 4' at opposite sides of the socket 4, so that this device in its entirety can be suitably secured to any particular receptacle for use in the manner described.

Either before or after the seed has been sown there is inserted through the socket 4 a stick 6 which has one end entering the ground and which has its other end provided with a handle portion 7. The spring tongue or finger 5 will frictionally engage with the stick to hold the box 1 from longitudinal movement thereon.

With my improvement the box containing a package or packages of seed and instructions regarding the planting and growth may be shipped directly to the purchaser, and with my improvement there can be no doubt as to the class of seed that is planted in the particular plot.

Having described the invention, I claim:

In combination, a stake adapted to be partly driven into the ground, a box supported thereon, a substantially rectangular plate formed with an intermediate substantially semi-cylindrical socket portion, and attaching flanges arranged at the opposite sides of said portion for securing the plate to one side of the box, said socket portion receiving said stake, and a resilient finger stamped from the outer side of said socket member and projecting within the latter to effectively engage said stake and thereby support the box in any desired position upon the latter.

In testimony whereof I affix my signature.

ANNA HENKE.

July 1, 1930.  A. HENKE  1,769,430
BOX
Filed Feb. 24, 1928
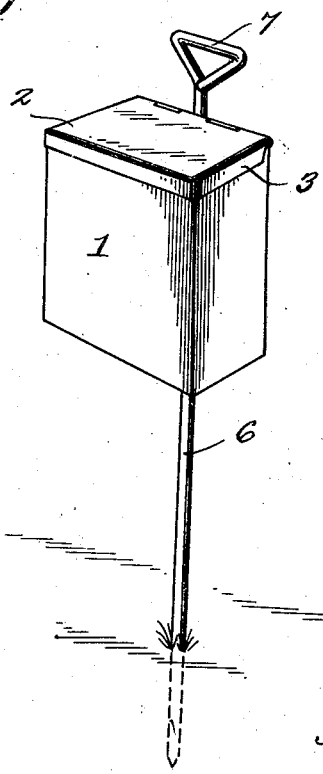
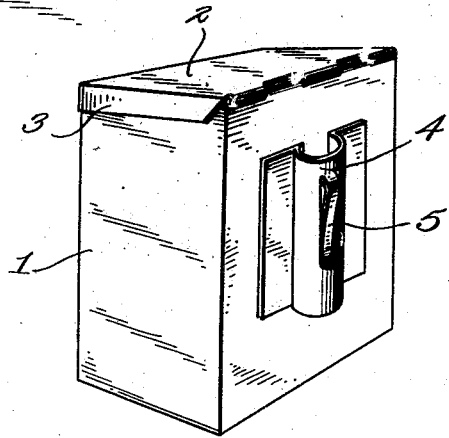
Anna Henke
INVENTOR
BY *Victor J. Evans*
ATTORNEY
WITNESS: